Dec. 8, 1931.  N. E. METHLIN  1,835,890
TRANSPORTABLE ORDNANCE MATERIAL FOR FIRING AGAINST AIRCRAFT
Filed Jan. 8, 1930  17 Sheets-Sheet 4
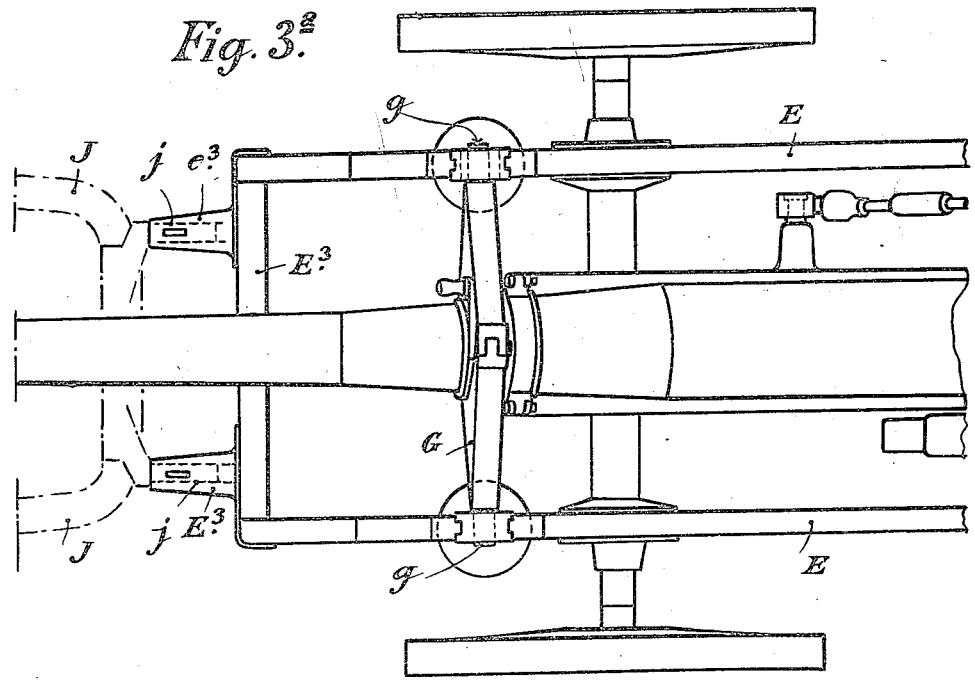
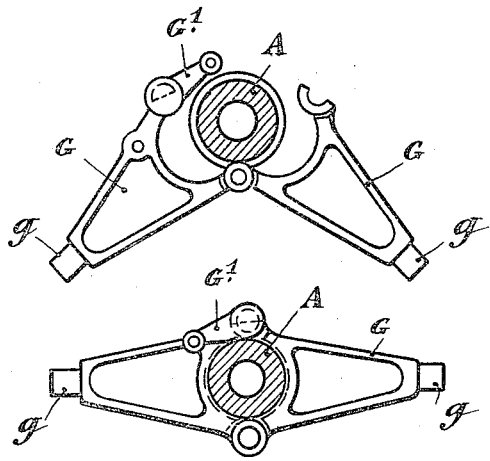
INVENTOR
Nicolas Emilien Methlin
BY Cameron, Kerkam & Sutton.
ATTORNEYS.

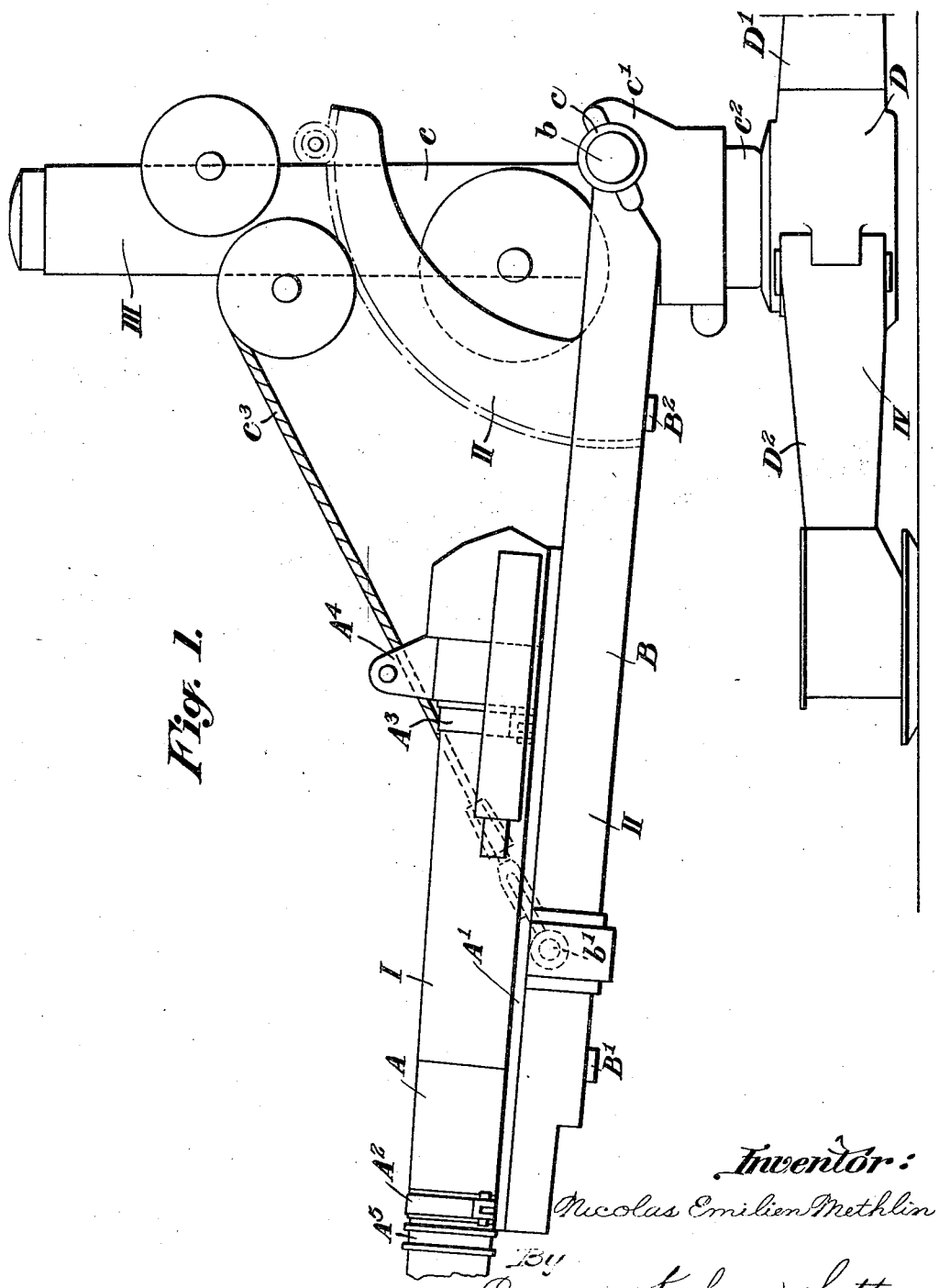

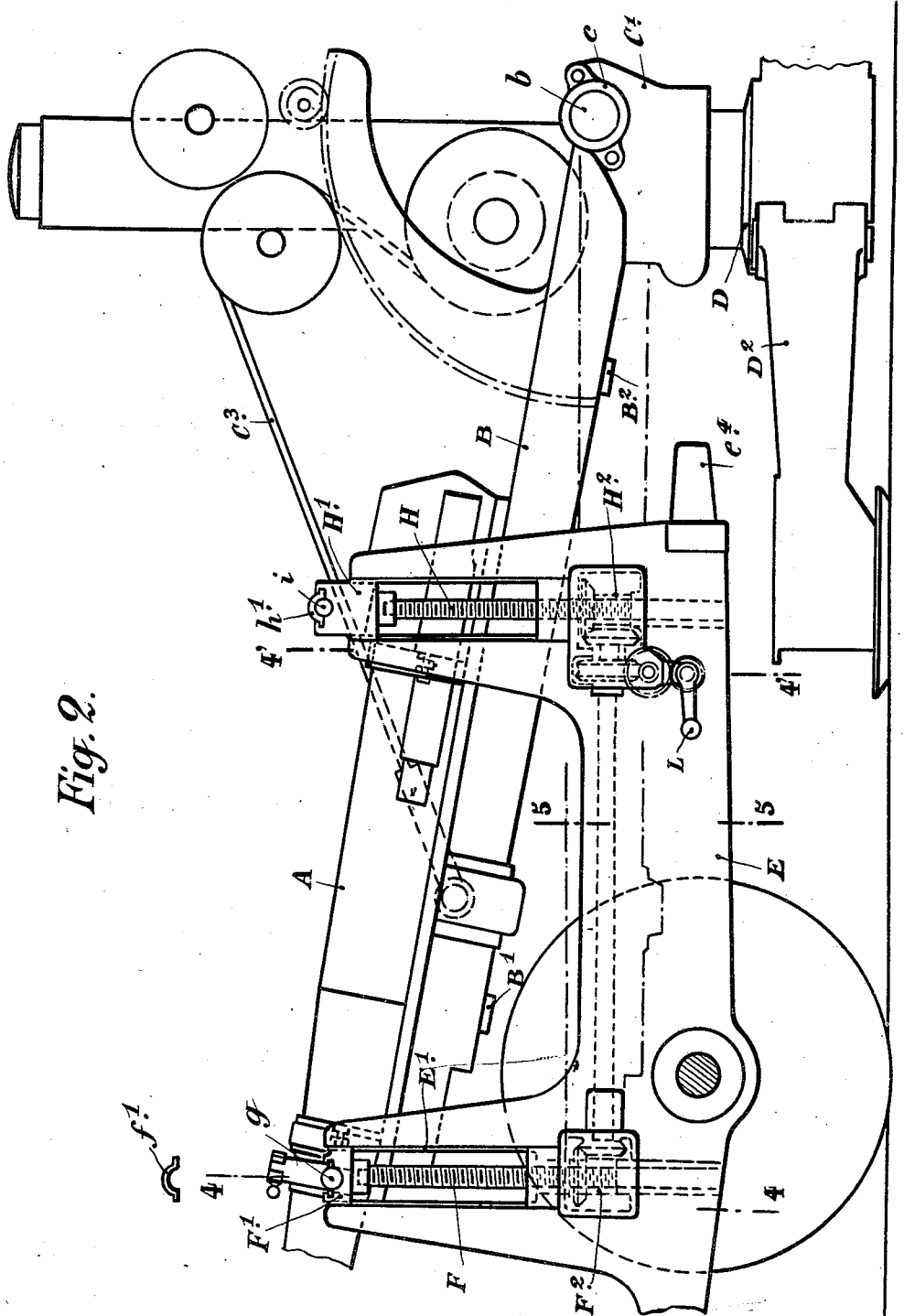

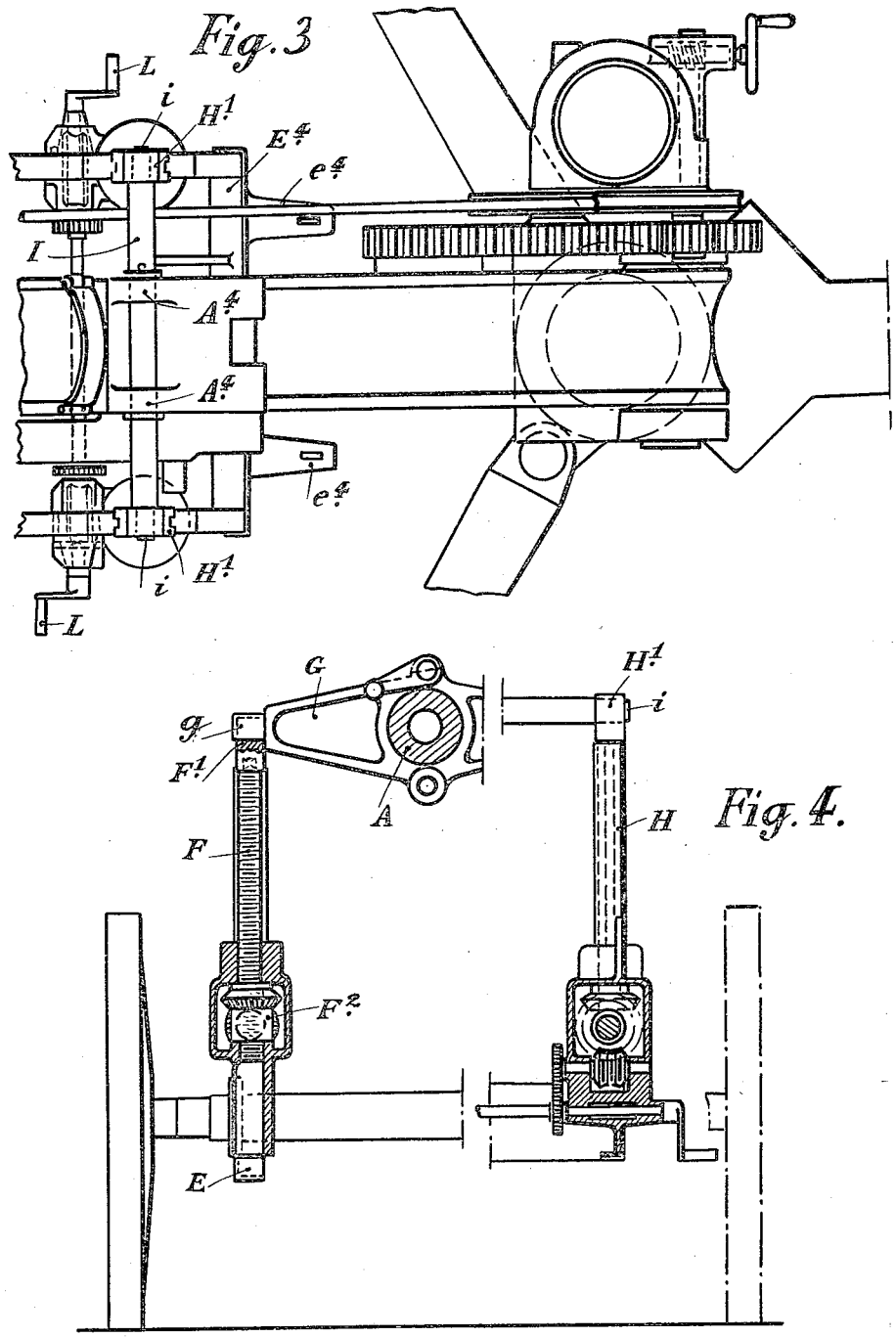

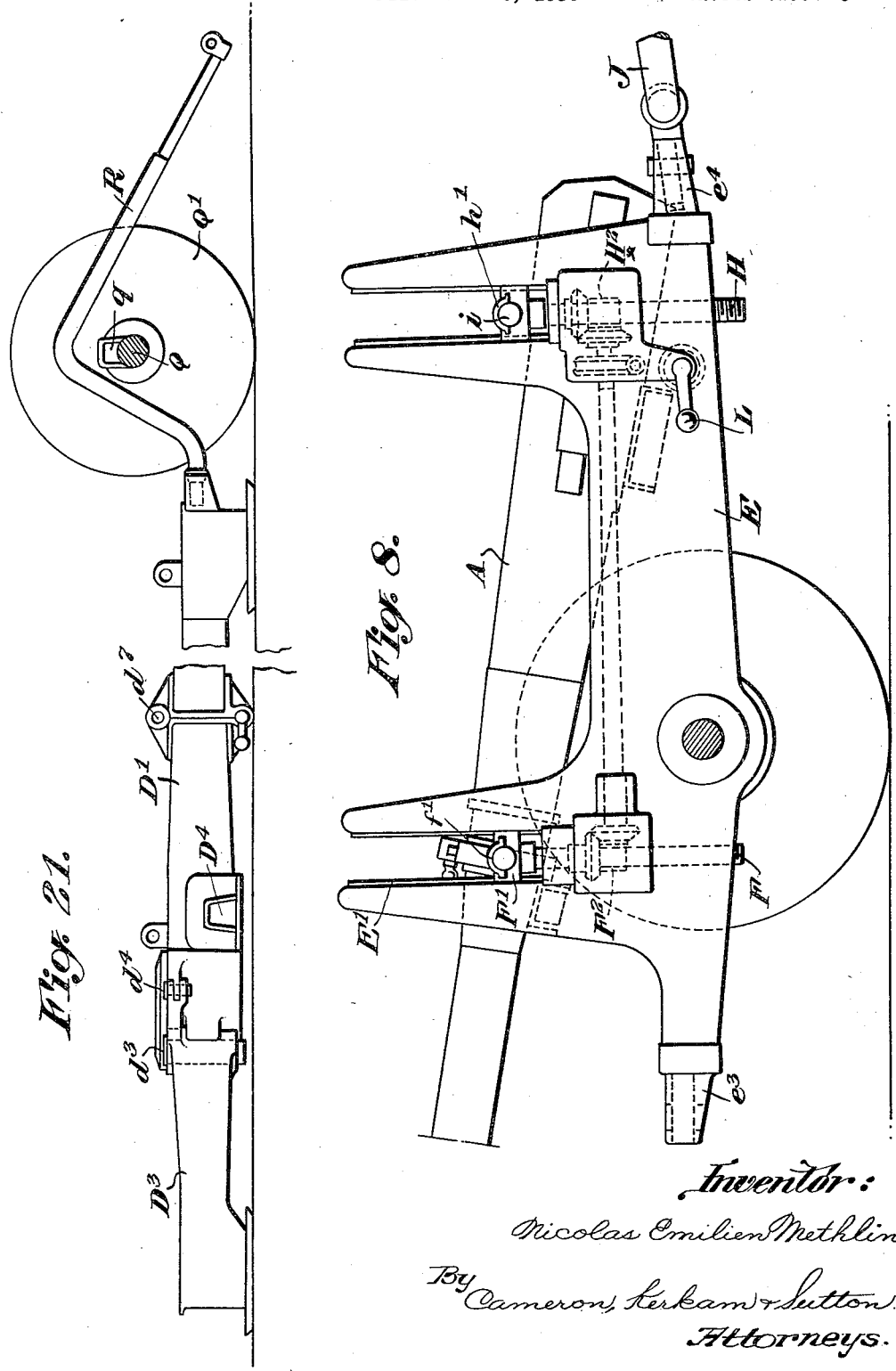

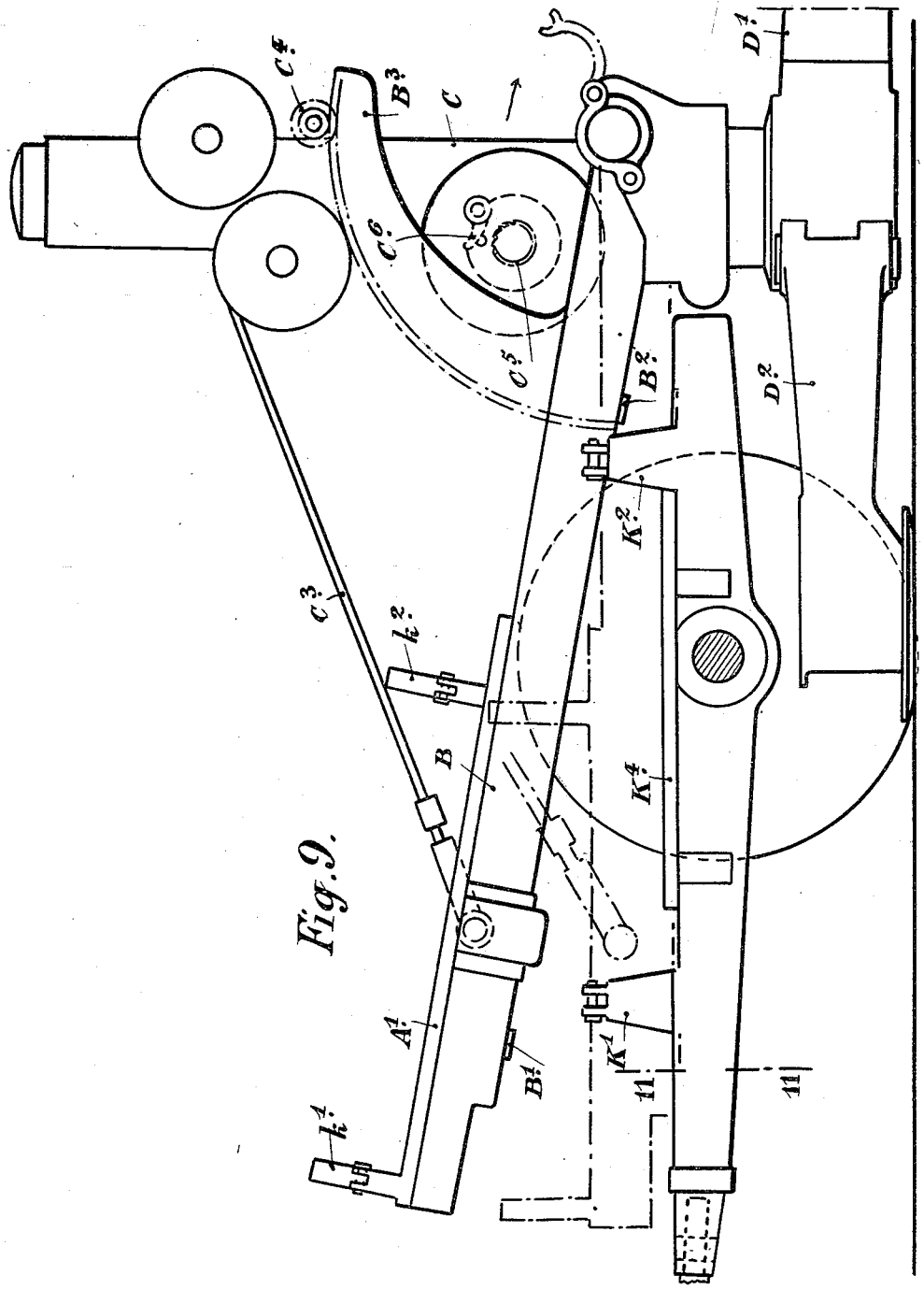

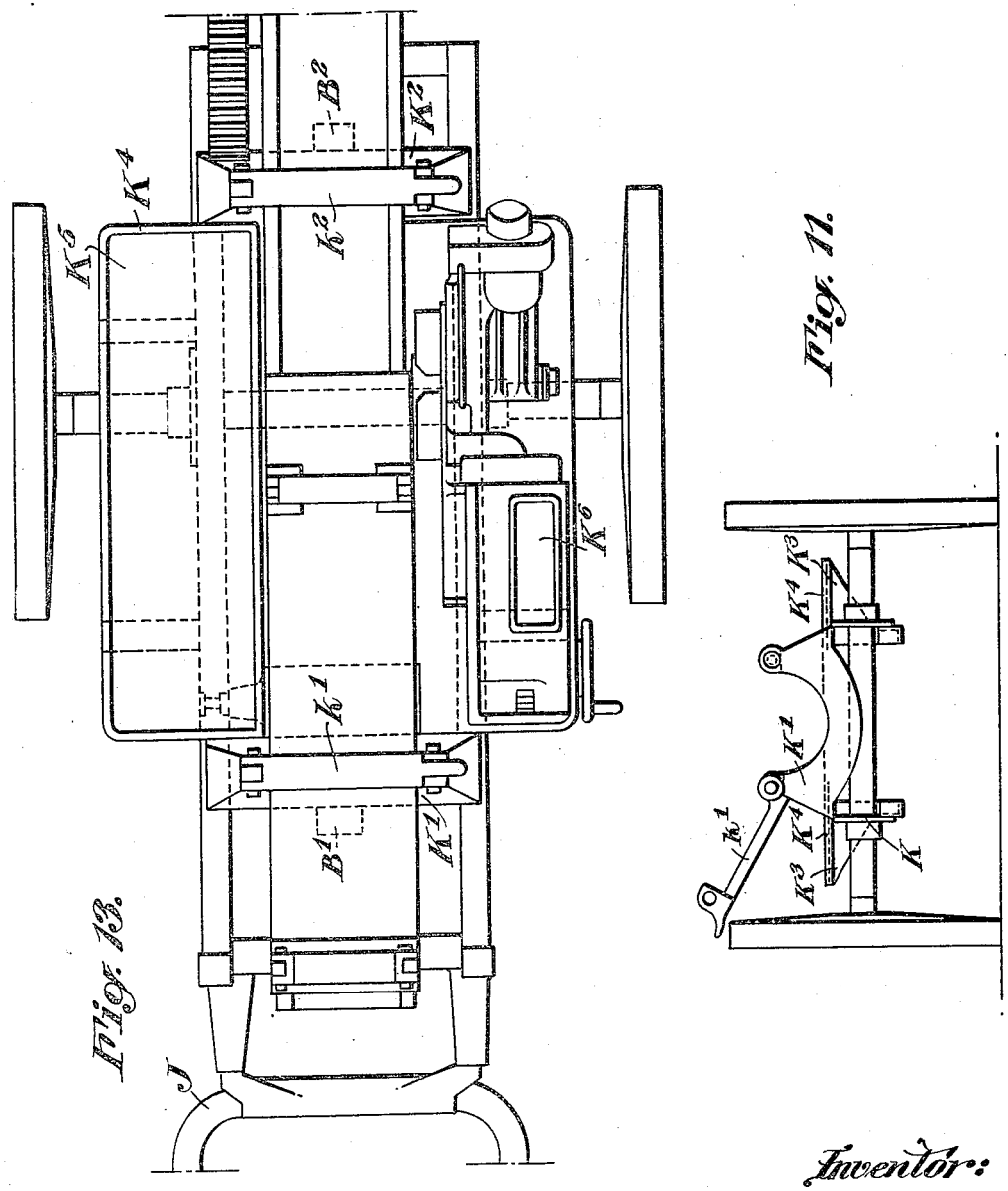

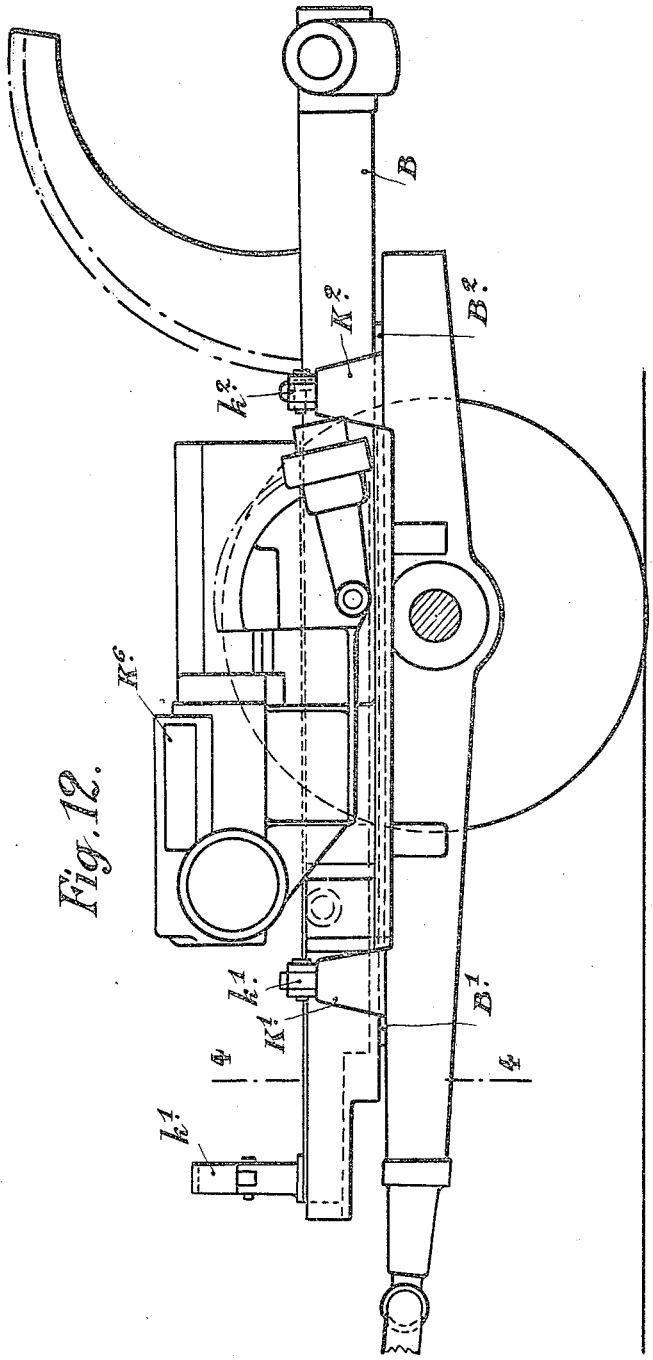

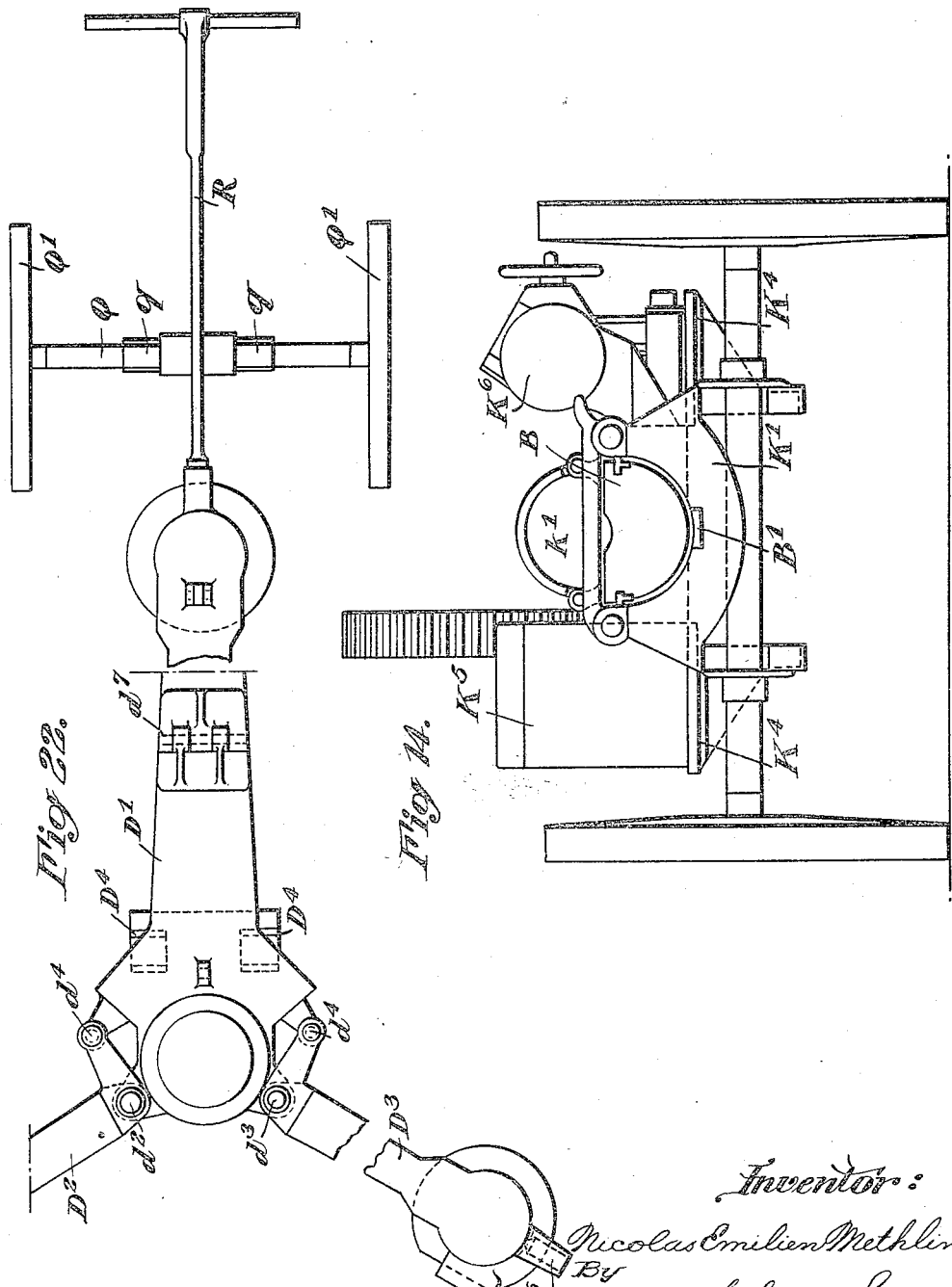

Dec. 8, 1931.    N. E. METHLIN    1,835,890
TRANSPORTABLE ORDNANCE MATERIAL FOR FIRING AGAINST AIRCRAFT
Filed Jan. 8, 1930    17 Sheets-Sheet 11
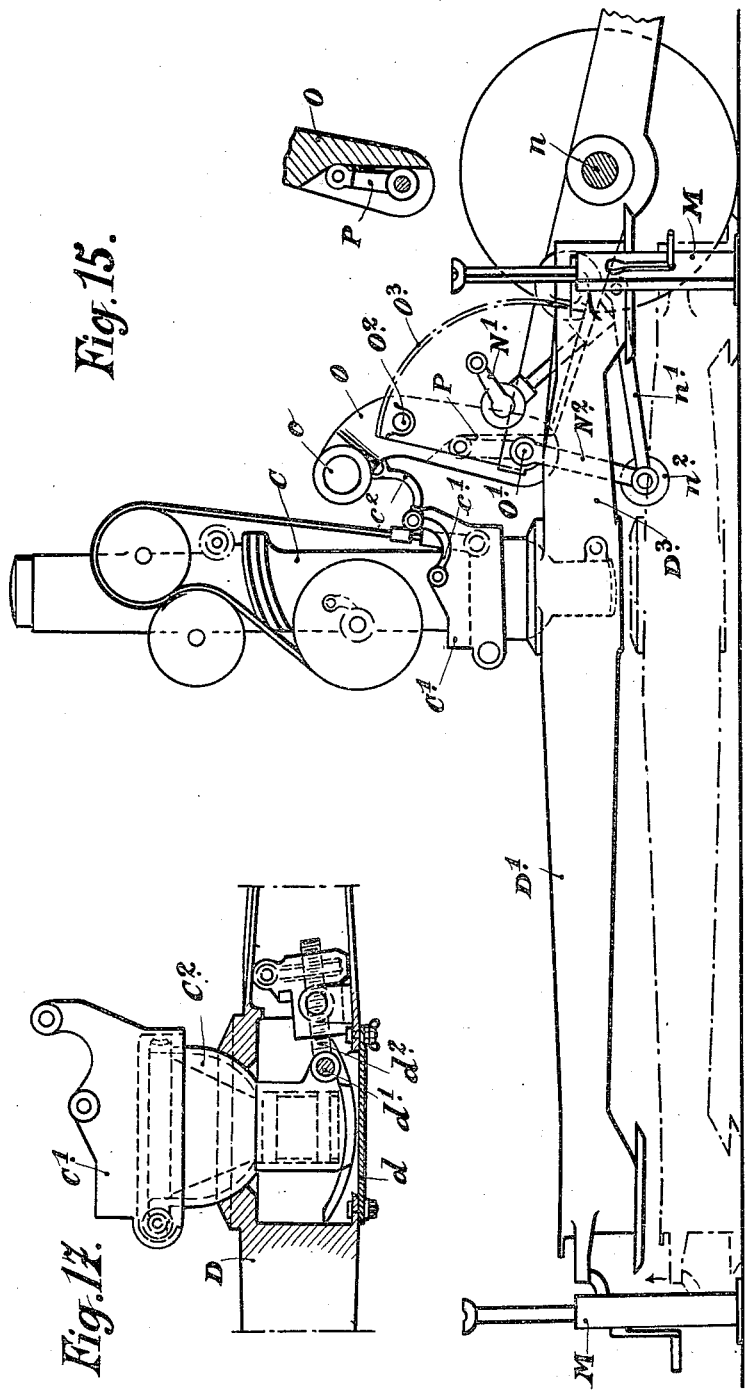
INVENTOR
Nicolas Emilien Methlin
BY Cameron, Kerkam & Sutton
ATTORNEYS.

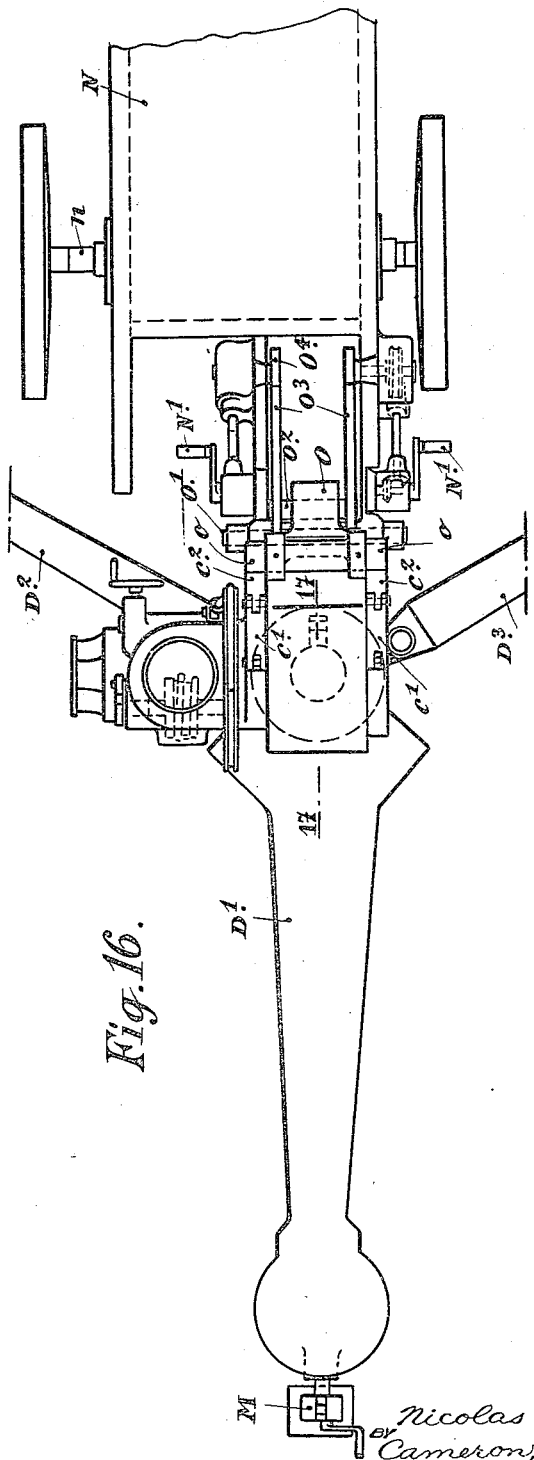

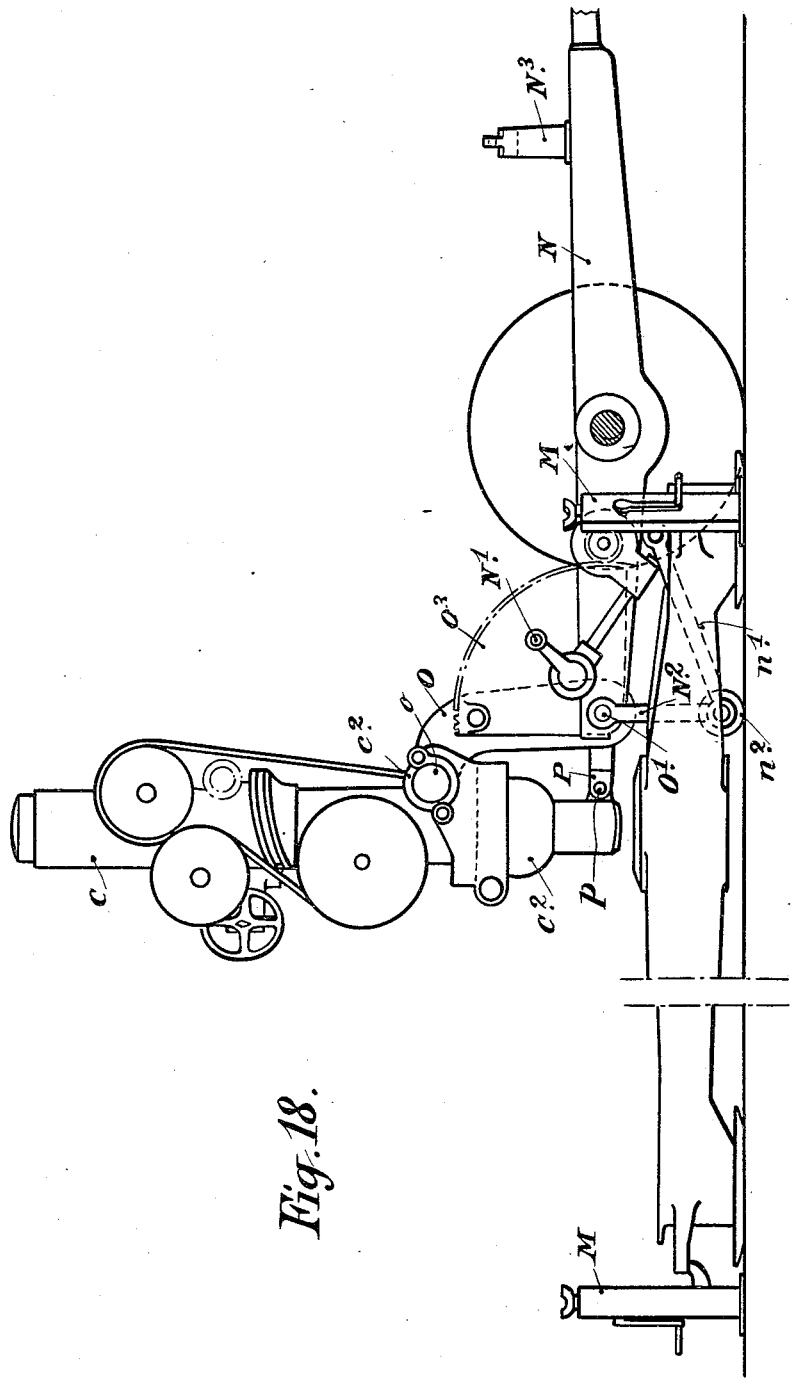

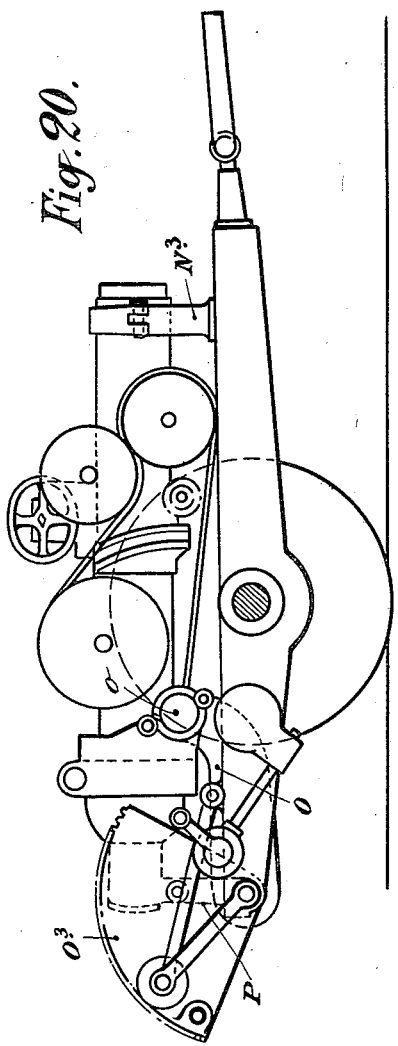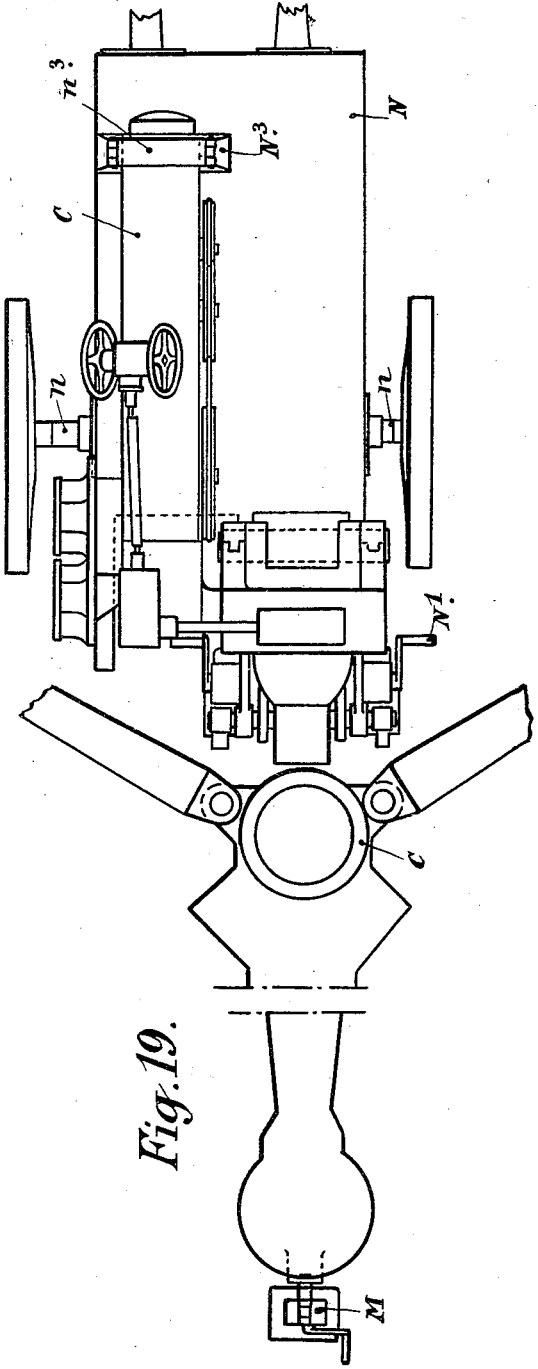

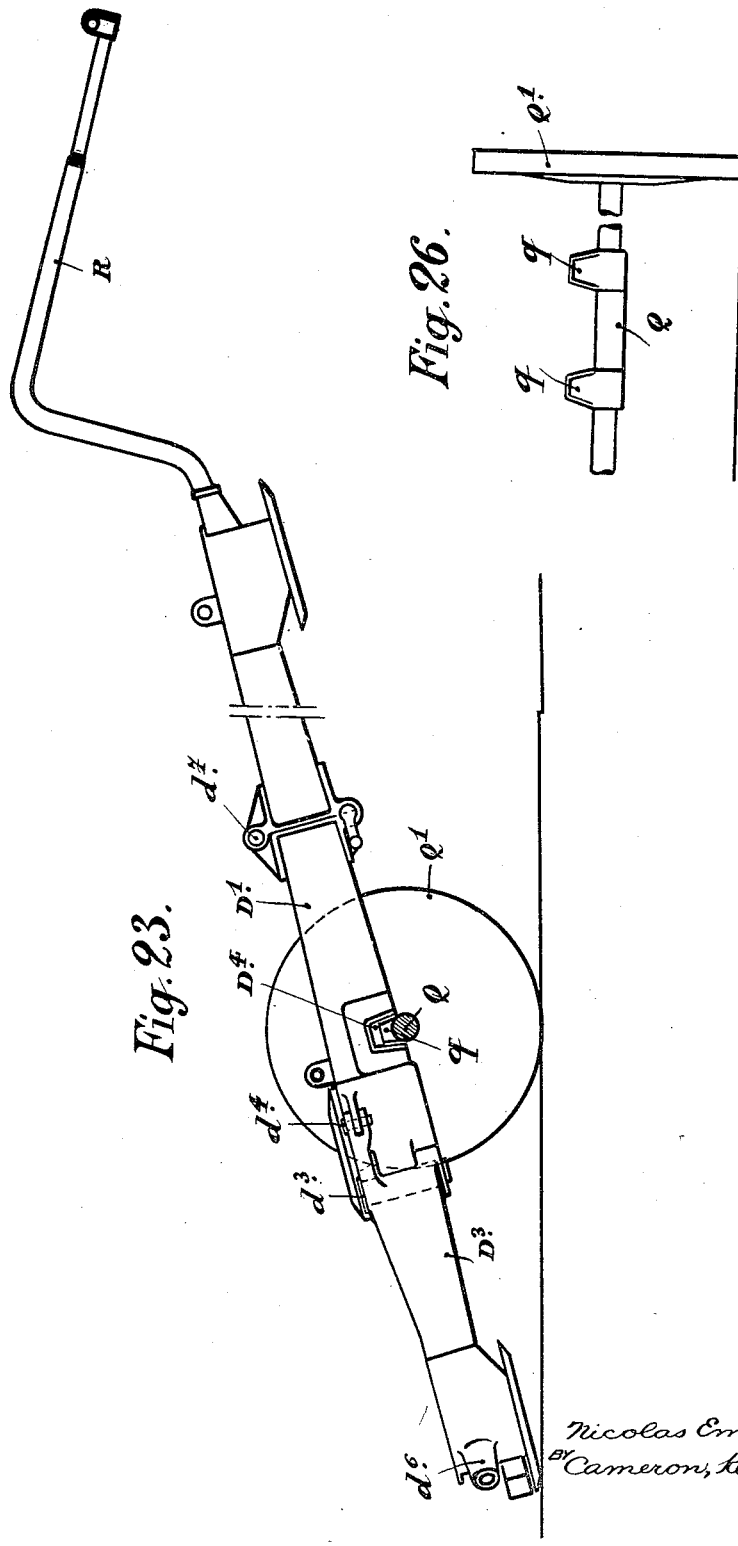

Dec. 8, 1931. N. E. METHLIN 1,835,890
TRANSPORTABLE ORDNANCE MATERIAL FOR FIRING AGAINST AIRCRAFT
Filed Jan. 8, 1930 17 Sheets-Sheet 16

INVENTOR
Nicolas Emilien Methlin
BY Cameron, Kerkam & Sutton
ATTORNEYS.

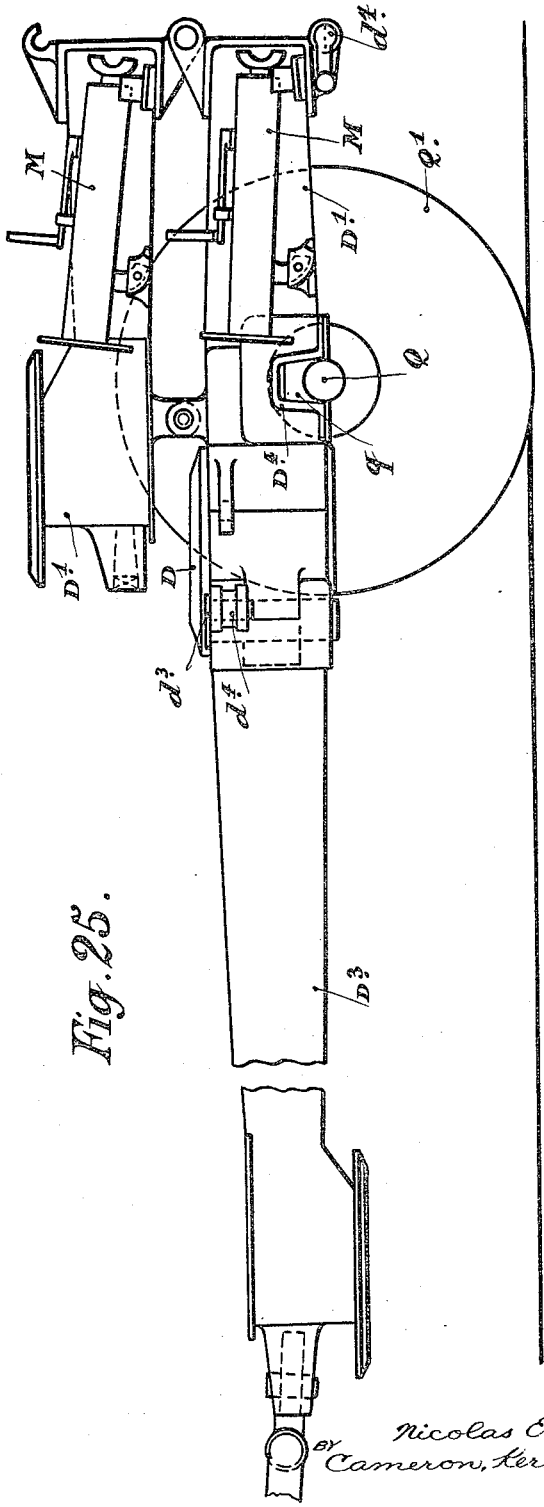

Patented Dec. 8, 1931

1,835,890

UNITED STATES PATENT OFFICE

NICOLAS EMILIEN METHLIN, OF PARIS, FRANCE, ASSIGNOR TO SCHNEIDER & CIE., OF PARIS, FRANCE, A LIMITED JOINT-STOCK COMPANY OF FRANCE

TRANSPORTABLE ORDNANCE MATERIAL FOR FIRING AGAINST AIRCRAFT

Application filed January 8, 1930, Serial No. 419,414, and in France January 22, 1929.

The object of the present invention is a practical form of construction of the anti-aircraft artillery gun forming the subject of U. S. Patent No. 1,672,949 and more particularly of U. S. Patent No. 1,658,005.

The new form of construction is characterized by its arrangement with a view to dividing the gun conveniently into sections for mounting and transporting upon separate vehicles, the latter being naturally themselves constructed in a special manner to receive the corresponding loads and to facilitate placing these loads in position.

The invention is illustrated in detail in the accompanying drawings.

Figure 1 is a longitudinal diagrammatic elevation of the gun to be divided into sections for loading it and transporting it upon four separate vehicles. The parts of the gun corresponding to the four vehicles are designated in this diagrammatic elevation by the references I, II, III, IV. The part I is formed by the gun tube or barrel proper; the part II is formed by the whole of the cradle, the sledge and the elevating sector; the part III is composed of the support which forms a top carriage and the connecting cable to the cradle; the part IV is formed by the anchoring platform, that is to say a foot step bearing for the support or top carriage III and an arrangement of three arms for anchorage to ground.

Figures 2 to 8 inclusive show the vehicle for transporting the part I, that is to say the gun tube or barrel proper, and the operations for loading this part upon the said vehicle. Figure 2 shows the vehicle after it has been brought into the desired position for loading the barrel, the whole of the oscillating mass having been itself previously brought into the desired position for loading up this separate element.

Figures 3 and 3a comprise a plan corresponding to Figure 2.

Figure 4 is a section half of which is taken along the line 4—4 and the other half along the line 4'—4' in Figure 2.

Figure 5 is a part section taken along the line 5—5 in Figure 2.

Figures 6 and 7 show two different positions of a trunnion carrying collar fitted to the tube for mounting the latter in place upon the corresponding transport vehicle.

Figure 8 shows the whole of the first vehicle and the part I in the travelling position.

Figure 10:
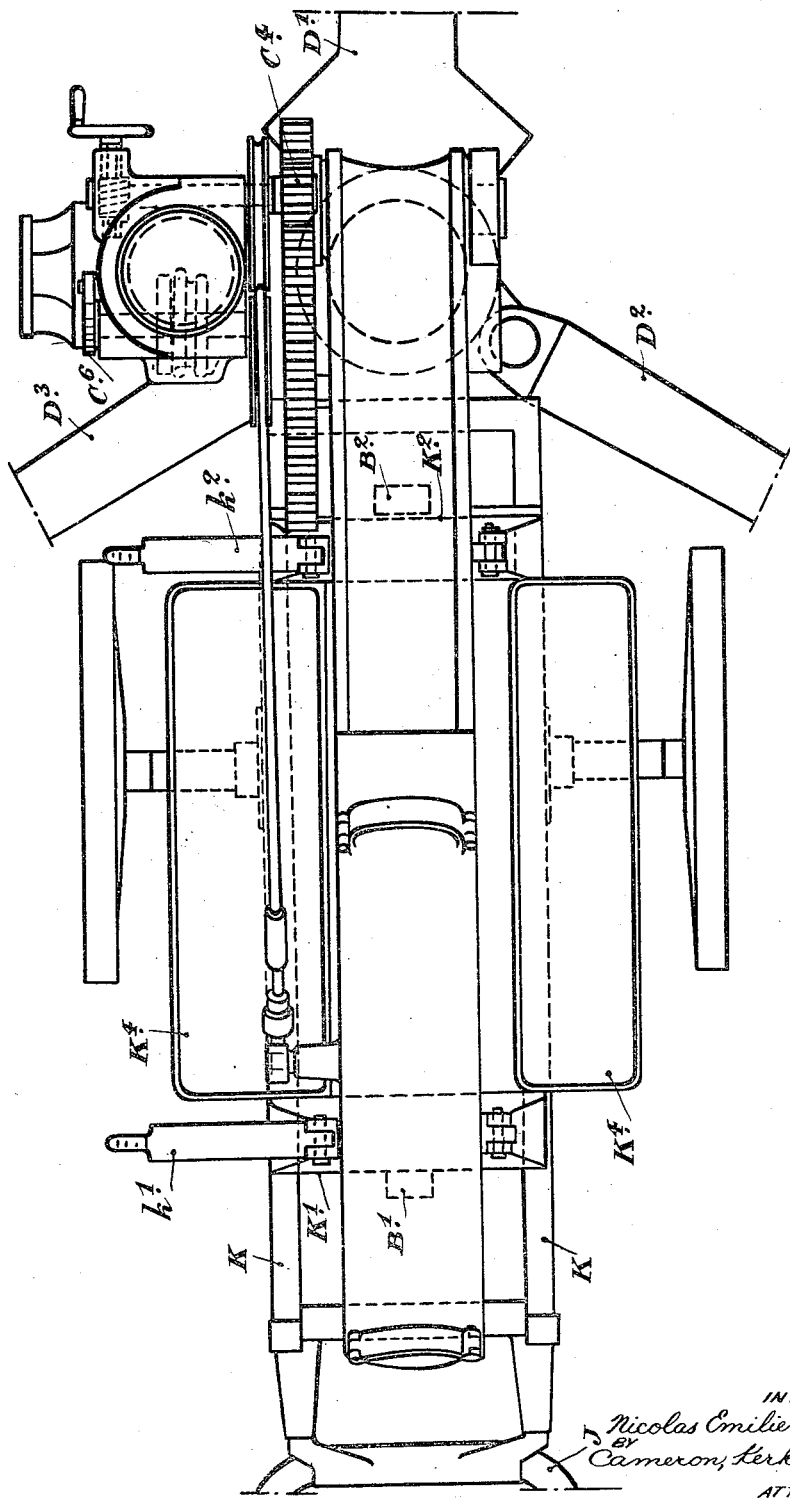

The gun to be transported conforms in its general lines to that described in U. S. Patent No. 1,658,005. It comprises as shown in Figure 1, a tube $A$ mounted upon a sledge $A^1$, the arrangement $A-A^1$ being adapted to recoil upon a cradle $B$ which is journalled at its back end by means of trunnions $b$ in bearings $c$ carried by a carriage $C$. The oscillating mass $A-A^1-B$ is entirely supported on account of the fact that the cradle $B$ is coupled at a point $b^1$ of the centre of gravity of the said mass to a spring balancing device disposed in the support $C$, this coupling being designed in such a way that for any angle of inclination of the mass a balance will be obtained in practice. The bearings $c$ are formed upon a small carriage $C^1$ which turns in a saddle $C^2$, itself movable by means of a knee-joint in a pedestal $D$ which can be anchored to the ground by three arms $D^1$, $D^2$, $D^3$, one of which $D^1$ may be rigidly integral with the pedestal, the other two $D^2$ and $D^3$ being connected to the said pedestal.

Normally, the part I, that is to say the gun barrel proper, is held upon the sledge $A^1$ by the half-collars $A^2$, $A^3$. These removable collars remain attached by one of their ends to cradle $B$ for transport. In order to load the gun tube $A$ upon its transport vehicle, a collar $G$ provided with trunnions is provided, which is shown in two different positions in Figures 6 and 7, and it is also provided with a removable cross member $I$ which will become lodged in side plates $A^4$ formed near the rear end of the gun tube in the neighbourhood of the breech.

The vehicle for transporting the gun tube, which is shown in Figures 2, 3 and 8, comprises two pairs of supporting jacks in longitudinal members E, one of the pairs of jacks F being provided for manipulating and supporting the front part of the barrel through the medium of the removable trunnion carrying collar G, while the other pair of jacks H is provided for manipulating and supporting the back part of the barrel through the medium of the removable cross member I placed in position in the side plates $A^4$.

In order to load up the gun for transporting, in other words, in order to divide it into sections with a view to mounting the various parts I, II, III, IV upon the corresponding vehicles, the oscillating mass is given an inclination of about 10°, as shown in Figure 1. The collars $A^2$, $A^3$ are disengaged and lowered upon the cradle and the removable trunnion carrying collar is moved into place in a groove $A^5$ provided upon the gun tube forward of the cradle. The trunnion carrying collar is as shown in Figures 6 and 7, constructed in two parts, which are engaged together by means of a pin bar $G^1$. Figure 6 shows the collar open before placing it in position. Figure 7 shows the collar closed and engaged upon the tube A. The trunnions $g$ are provided at the desired distance apart in order to rest upon the heads $F^1$ of the jacks F when the latter have been raised to the desired height by means of operating gear which is common to the jacks F and jacks H. Similarly the cross member I carries two pins or trunnions $i$ which rest upon the heads $H^1$ of the jacks H. The heads $F^1$ and $H^1$ are guided respectively in slots $E^1$ and $E^2$ provided in the longitudinal members E.

In the example shown provision has been made of a transmission gear operated by a crank handle L and driving the nuts $F^2$ and $H^2$ respectively through a suitable drive, such as that shown, the effect of which is to raise the screws F, H and the heads $F^1$, $H^1$ sliding in the guides $E^1$ and $E^2$ respectively. When the heads $F^1$, $H^1$ of the jacks have come into contact with the trunnions $g$ and $i$ respectively, these heads are closed by the caps $f^1$ and $h^1$. By then operating the elevating mechanism the cradle B can be lowered, while the barrel with the vehicle which carries it are maintained in the position shown in Figure 2. When the cradle has been brought approximately into a horizontal position, a pull exerted upon the vehicle E will cause it to move away with the load it carries.

For travelling purposes it will then be possible by operating the jacks F, H again to lower the barrel into the position shown in Figure 8 and to disengage the shaft J which until this moment for the operation which has just been performed, was engaged by tenons $j$ in sockets $e^3$ formed upon one of the cross members $E^3$ of the chassis. The shaft will then be brought into the position shown in Figure 8 by engaging the tenons $j$ in sockets $e^4$ carried by the other end cross member $E^4$ of the chassis.

Figures 9 to 14 inclusive show the operations for loading the part II of the gun upon a second vehicle, in other words, for loading upon the cradle with the sledge and the elevating sector. Figure 9 is a longitudinal elevation. Figure 10 is a corresponding plan view showing the vehicle after it has been moved into position for loading up. Figure 11 is a cross sectional elevation taken along the line 11—11 in Figure 1. Figures 12, 13 and 14 show in longitudinal elevation in plan and in cross section along the line 14—14 in Figure 12 respectively, the vehicle with its load in the travelling position.

For the purpose of loading it upon the corresponding vehicle, the cradle B is provided with two wedges or keys $B^1$, $B^2$ at a suitable distance from its front and rear ends, which keys for transport purposes become positioned respectively in front of and behind two cross members $K^1$, $K^2$ of the vehicle, the chassis of which comprises two longitudinal frame members K.

These cross members $K^1$, $K^2$ are constructed to form bearings which engage the shape of the cradle B. To each of these cross members is pivoted a cap $k^1$ and $k^2$ respectively; when these caps are lowered upon the bearing forming bodies $K^1$ and $K^2$ they will hold the whole of the cradle B and the sledge $A^1$ secured upon the vehicle and will prevent any lifting of the latter, any longitudinal displacements being prevented by the keys or wedges $B^1$, $B^2$.

In order to load up this second portion B—$A^1$, the vehicle K—$K^1$—$K^2$ is brought into the position shown in Figures 9 to 11, the cross members $K^1$ and $K^2$ moving into the desired position to receive the cradle B. It is then possible, by operating the elevation mechanism to lower the cradle until it comes into contact with the supporting bearings formed by the cross members $K^1$ and $K^2$, the keys or stops $B^1$ and $B^2$ thus occupying the position shown in Figures 12, 13, and 14. The caps $k^1$ and $k^2$ are then lowered over the cradle and secured. In order to be able to remove the portion 11, it will only be necessary to disengage the cable $C^3$ and separate the pinion $C^4$ from engagement with the elevating sector $B^3$ which operation may be effected either by dismounting the pinion $C^4$ or by means of any suitable device which permits the pinion $C^4$ or a part of the teeth of the sector $B^3$ to be temporarily withdrawn. Further it is necessary to secure the spring balancing device in the interior of the shaft C which may be effected easily by engaging the ratchet $C^5$ by means of the pawl $C^6$ (Figures 9 and 10). The cable $C^3$ disengaged from the cradle B is hocked on to the shaft C, as shown in Figure 15 which relates to the operation of loading up the portion III of the gun.

The chassis of the vehicle may, as shown more particularly in Figures 10 and 11, be provided with brackets $K^3$ for supporting the piston $K^4$ upon which various accessories, for example a tool box $K^5$ and a fuse setter $K^6$, (Figures 13 and 14) may be placed for transport.

Figures 15 to 20 inclusive illustrate the operation of loading up the portion III upon the corresponding vehicle. Figure 15 is an elevation. Figure 16 is a corresponding plan showing this part III and the vehicle in the first stage of the loading operation. Figure 17 is a part sectional elevation taken along the line 17—17 in Figure 16. Figure 18 is an elevation showing a second stage of the operation. Figure 19 shows in plan view a third stage of this operation. Figure 20 is an elevation of the vehicle with the part it carries, in the travelling position.

As shown in Figures 15 to 17, the part III, that is to say the support C and the elevating mechanism with the exception of the sector $B^3$ carried by the cradle, together with the top carriage $C^1$ and the saddle $C^2$ is at the commencement of the operation supported by the bottom carriage formed by the pedestal D and the arms $D^1$, $D^2$ and $D^3$.

The arms $D^1$, $D^2$ and $D^3$ are lifted by their free ends by means of three jacks M, as shown in Figure 15 which illustrates the whole of the bottom carriage and the part III raised, in full lines, the bottom carriage being shown in dot-and-dash lines in this starting position.

The vehicle N comprises a device for manipulating the part III. This device is formed, as shown in Figures 15 and 16, by an arm O pivoting about a shaft $O^1$ journalled in the chassis of the vehicle. This arm is adapted to be made rigid by means of a removable pin $O^2$ with two toothed sectors $O^3$ loosely mounted like the arm O upon the shaft $O^1$. The arm O is constructed in the form of a fork and carries at the end of its prongs, trunnions $o$ which are adapted to occupy upon the top carriage C the place which the trunnions of the cradle B occupied in the gun. By means of suitable transmission devices such as those shown in Figures 15 and 16, which are operated by means of the crank handles $M^1$, it is possible when the vehicle has been moved into the position it occupied in the said figure, to lower the whole of the arm O and the sectors $O^3$ which are made rigid with each other by the removable pin $O^2$ into the desired position for the trunnions $o$ to engage in the bearings $c^1$ of the top carriage $C^1$. The chassis of the vehicle follows this movement and pivots about the axle $n$. The caps or cover-straps $c^2$ are then lowered and secured upon the top carriage. When this has been done the part III is disengaged from the bottom carriage forming the part IV. For this purpose the closing plate $d$ is disengaged by lowering it or in any other suitable manner and the saddle $C^2$ is disengaged from the bottom carriage D by removing the pin $d^1$ (Figure 17). It is then possible by operating the jacks M to return the bottom carriage into contact with the ground in the position it occupies in Figure 18.

The forked lever P mounted upon the shaft $O^1$ will be made to occupy with respect to the saddle $C^2$ the place of the attachment member $d^2$ (Figure 17). The assembly between the forked lever P and the saddle $C^2$ will naturally have to be completed by a pin $p$. The members at this moment occupy the position shown in Figure 18, the forward part of the vehicle N bearing upon the ground through the medium of rollers $n^2$ carried by struts $N^2$, pivotally connected to the chassis N. The struts $N^2$ may moreover be connected to the chassis by rods or struts $n^1$. By operating the transmission by means of crank handles $N^1$ the part III is lowered on to its transport vehicle and it is thus brought into the position shown in Figure 19, the upper part of the support C resting upon a bearing $N^3$ the cap of which $n^3$ is lowered in order to secure the said support C in position.

The whole of the part III is securely held upon the vehicle N by the cap $n^3$ on the one hand, and by the pivotal connection to the arm O and to the link P on the other hand (Figure 19). The sectors $O^3$ which, for the operation of loading the part III on to the chassis N, have been lowered, will have to be raised into a travelling position. For this purpose it will be sufficient after having removed the pin $O^2$ to operate the crank handles $N^1$ by travelling the sectors $O^3$ over the pinion $O^4$; the members will thus be moved into the position shown in Figure 20.

There only remains the bottom carriage formed by the pedestal D and the arms, $D^1$, $D^2$, $D^3$, to be loaded up on to the corresponding vehicle. This operation is shown in Figures 21 to 26 inclusive. Figure 21 shows the bottom carriage which remains upon the ground after the part III has been removed.

Figure 24:
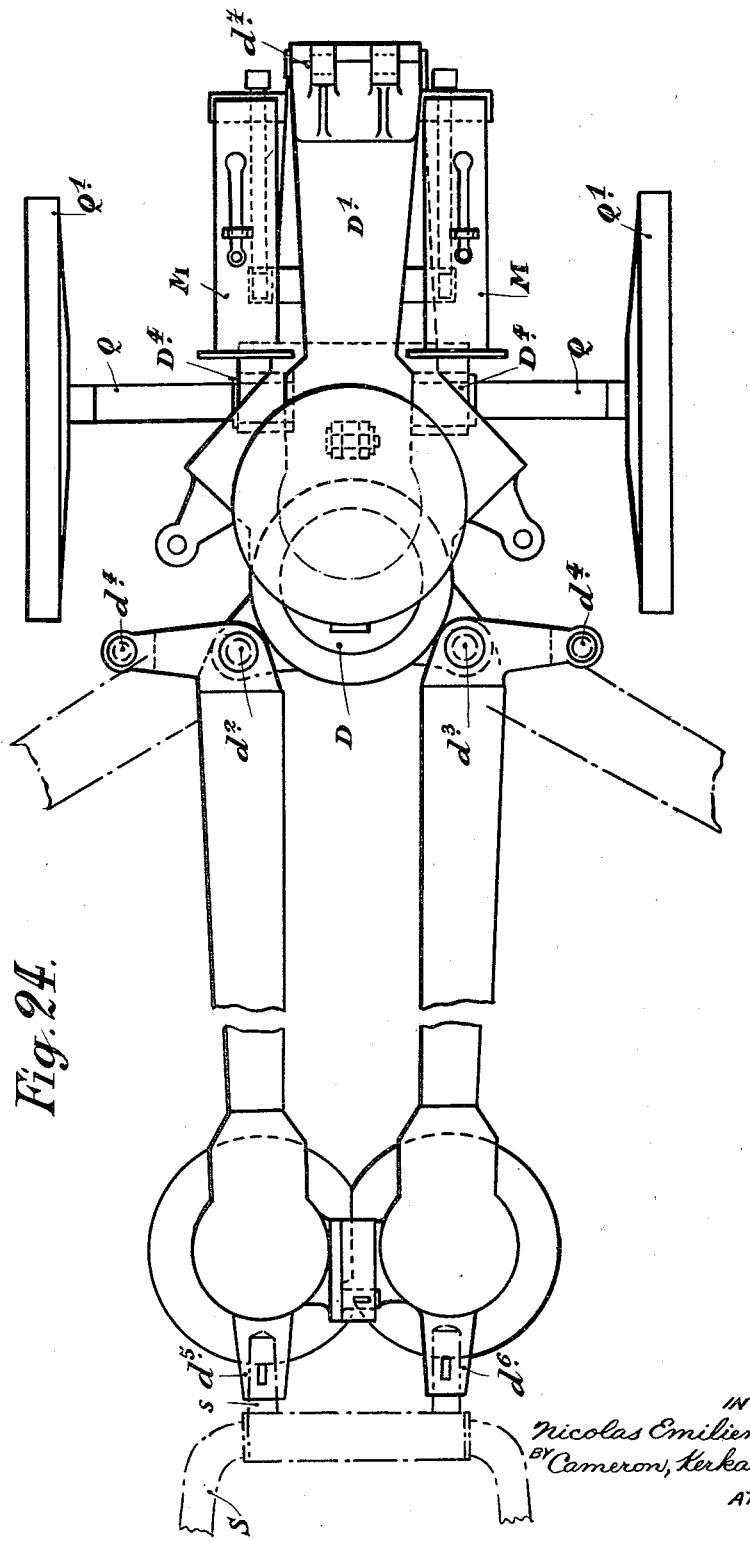

The vehicle for transporting the part IV is formed by a simple train of wheels $Q^1$—Q—$Q^1$. The axle of this train of wheels comprises as shown in Figure 26, two projections $q$ upon which will be engaged corresponding mortices $D^4$ formed in the arm $D^1$ near the point of attachment upon pedestal D. In the end part of the arm $D^1$ is engaged a lifting bar R permitting the arm $D^1$ to be raised in the known manner and as indicated in U. S. Patent No. 1,658,005, by making the whole of the bottom carriage bear upon the ground by the ends of the two arms $D^2$, $D^3$. When the arrangement has been raised into the position indicated in Figure 3, the train of wheels $Q^1$—$Q$—$Q^1$ can be brought into the desired position to engage the mortices $D^4$ upon the tenons or projections $q$. The load is made to swing about the axle Q, and then the arms $D^2$, $D^3$ are lowered towards each other after having disengaged them by pivoting around the shafts $d^2$ and $d^3$, care having been taken naturally to remove the attachments $d^4$. A shaft S is engaged by the tenons $s$ in the sockets $d^5$, $d^6$ provided at the ends of the arms $D^2$ and $D^3$ respectivley and finally the arm $D^1$ is folded back by turning back is free end around the pivot $d^1$. A pin bar of known construction may serve alternatively for rendering the two parts of the arm $D^1$ rigid with respect to each other in the extended position of the arm (Figures 21, 22 and 23) and in the folded position of the arm (Figures 24 and 25). The jacks M which have served for moving the bottom carriage may, for the purpose of transport, be packed upon the arm $D^1$ as shown in Figures 24 and 25.

Claims:

1. An anti-aircraft artillery gun characterized by the feature that the gun is constructed so as to form four readily detachable sections, which sections are combined for transport with four separate vehicles as follows: a first part formed of a gun tube having a removable collar carrying trunnions and a vehicle comprising a frame having guides, two pairs of jacks in said guides, one pair of jacks having heads forming bearings for the trunnions on the collar, the other pair of jacks having heads forming bearings, a removable cross member adapted to rest in the bearings of the second pair of jacks and engage parts provided on the gun tube; a second part formed of a cradle elevating sector and sledge and provided with a second vehicle comprising a frame having cross members with bearings shaped to receive the cradle, said bearings being adapted to engage spaced stops on the cradle for preventing longitudinal movement of the cradle, and projections on the frame members which together with plates form a support for a tool box and fuse setter; a third part formed of a support carrying a top carriage, saddle balancing device and elevating mechanism, and a third vehicle comprising an arm pivoted to the vehicle, trunnions on said arm adapted to be connected to the cradle support, toothed sectors mounted on the vehicle and adapted to be connected to said arm, operating mechanism carried by the vehicle for rotating the toothed sectors, retaining means on the frame for engaging the cradle support, and a forked lever on the frame for securing the saddle of the support; a fourth part formed of the bottom carriage including a pedestal and jointed anchoring arms having a mortice, together with a fourth vehicle comprising a truck having an axle, and a tenon on said axle, whereby the mortice on said arm is engaged by said tenon when the pedestal is mounted on the vehicle and the arms are folded on their joints.

2. An anti-aircraft artillery gun, made in four separable and readily detachable units, one unit consisting of a bottom carriage including a pedestal provided with a bearing socket and anchoring arms attached to said pedestal, a second unit including a support having a saddle rotatably journaled in the bearing socket of the pedestal, a top carriage, a balancing device, and elevating mechanism, said support being also provided with trunnion bearings, a third unit including a cradle, elevating sector, and sledge, said cradle having trunnions detachably connected to the bearings in said support, and a fourth unit comprising a gun barrel detachably connected to the sledge.

3. In an apparatus of the character described, a gun comprised of four separable and quickly detachable units, a carriage for each unit, said carriages having mechanism for demounting the units, and fittings on each carriage for holding a particular unit for purposes of transport.

4. A vehicle for transporting heavy barrels of a gun as described in claim 2, comprising a pair of longitudinal frame members, a pair of jacks mounted in guides on said frame members, a trunnioned collar adapted to clamp the gun barrel, bearings on the heads of said jacks and in which the trunnions of said collar are supported, a second pair of jacks also supported in guides on said frame members, and a removable cross member seated in bearings on the heads of said second pair of jacks, said cross member being adapted to engage parts of the gun barrel.

5. A vehicle for transporting a cradle, elevating sector and sledge of a gun as described in claim 2, comprising a frame having cross members with bearings shaped to receive the cradle, said bearings being adapted to engage spaced stops on the cradle for preventing longitudinal movement of the cradle, and projections on the frame members which together with plates form a support for a tool box and fuse setter.

6. A vehicle for transporting the cradle-support of a gun as described in claim 2, comprising an arm pivoted to the vehicle, trunnions on said arm adapted to be connected to cradle-support, toothed sectors mounted on the vehicle and adapted to be connected to said arm, operating mechanism carried by the vehicle for rotating the toothed sectors, retaining means on the frame for engaging the cradle-support, and a forked lever on the frame for securing the saddle of the support.

7. A vehicle for transporting a pedestal of a gun as described in claim 2, having a jointed anchoring arm provided with a mortice, said vehicle comprising a truck having an axle, and a tenon on said axle, whereby the mortice on said arm is engaged by said tenon when the pedestal is mounted on the vehicle and the arm is folded on its joint.

In testimony whereof I have signed this specification.

NICOLAS EMILIEN METHLIN.